(12) United States Patent
Beeri et al.

(10) Patent No.: US 8,089,396 B2
(45) Date of Patent: Jan. 3, 2012

(54) SYSTEM AND METHOD FOR VOLUME VISUALIZATION IN ULTRA-WIDEBAND RADAR

(75) Inventors: Amir Beeri, Zoran (IL); Benjamin Boxman, Herzilya (IL); Erez Doron, Tel Aviv (IL); David Gazelle, Kfar-Hess (IL)

(73) Assignee: Camero-Tech Ltd., Kfar Neter (IL)

( * ) Notice: Subject to any disclaimer, the term of this patent is extended or adjusted under 35 U.S.C. 154(b) by 479 days.

(21) Appl. No.: 12/295,818

(22) PCT Filed: Apr. 1, 2007

(86) PCT No.: PCT/IL2007/000427
§ 371 (c)(1),
(2), (4) Date: Oct. 2, 2008

(87) PCT Pub. No.: WO2007/113824
PCT Pub. Date: Oct. 11, 2007

(65) Prior Publication Data
US 2009/0243916 A1  Oct. 1, 2009

(30) Foreign Application Priority Data
Apr. 3, 2006 (IL) .......................................... 174737

(51) Int. Cl.
*G01S 13/00* (2006.01)
(52) U.S. Cl. ....................................................... 342/179
(58) Field of Classification Search .................. 342/179; 345/419, 424, 428
See application file for complete search history.

(56) References Cited

U.S. PATENT DOCUMENTS

| 4,835,532 A | * | 5/1989 | Fant ............................... 345/611 |
| 5,061,935 A | | 10/1991 | Sekine et al. |

(Continued)

FOREIGN PATENT DOCUMENTS

WO    WO 01/01168 A2    1/2001

(Continued)

OTHER PUBLICATIONS

Drebin et al., "Volume Rendering," *Computer Graphics*, vol. 22, No. 4, Aug. 1-5, 1988, Atlanta, GA, pp. 65-74.

(Continued)

*Primary Examiner* — Daniel Pihulic
(74) *Attorney, Agent, or Firm* — Oliff & Berridge, PLC (57) ABSTRACT

Herewith disclosed a method for volume visualization in ultra-wideband radar and a system thereof. The method comprises perceiving processing provided in order to facilitate a meaningful representation and/or an instant understanding of the image to be displayed, said perceiving processing resulted in generating one or more perceiving image ingredients. The perceiving image ingredient may be, for example, a shadow added to the reconstructed image, a position-dependent color scheme applied to the reconstructed image, a color scheme adapted to external lighting conditions and applied to the reconstructed image, a Halo artificially added to the reconstructed image, a distinctive color scheme applied to time-invariant and time-variant elements of the reconstructed image, etc.

14 Claims, 8 Drawing Sheets

U.S. PATENT DOCUMENTS

| | | | |
|---|---|---|---|
| 5,280,344 A | | 1/1994 | Witlin et al. |
| 5,317,689 A | * | 5/1994 | Nack et al. ............... 345/505 |
| 5,339,085 A | | 8/1994 | Katoh et al. |
| 5,379,215 A | * | 1/1995 | Kruhoeffer et al. ............ 702/3 |
| 5,668,555 A | * | 9/1997 | Starr ........................ 342/179 |
| 5,793,375 A | | 8/1998 | Tanaka |
| 5,900,833 A | | 5/1999 | Sunlin et al. |
| 6,198,428 B1 | | 3/2001 | Sekine |
| 6,212,132 B1 | | 4/2001 | Yamane et al. |
| 6,571,177 B1 | | 5/2003 | Hardy |
| 6,639,597 B1 | * | 10/2003 | Zwicker et al. ............ 345/428 |
| 2004/0125103 A1 | * | 7/2004 | Kaufman et al. ........... 345/419 |
| 2009/0243916 A1 | * | 10/2009 | Beeri et al. ................ 342/179 |

FOREIGN PATENT DOCUMENTS

| | | |
|---|---|---|
| WO | WO 2005/109034 A1 | 11/2005 |
| WO | WO 2007113824 A2 * | 10/2007 |

OTHER PUBLICATIONS

Brodlie et al., "Recent Advances in vol. Visualization," *Computer Graphics Forum*, vol. 20, No. 2, 2001, pp. 125-148.

Woo et al., "A Survey of Shadow Algorithms," *IEEE Computer Graphics Applications*, vol. 10, No. 6, Nov. 1990, pp. 13-29.

Grimm et al., "Flexible Direct Multi-Volume Rendering in Dynamic Scenes," *VMV 2004*, Stanford, USA, Nov. 16-18, 2004.

Claxton et al., "Laser Scanning Confocal Microscopy," *Department of Optical Microscopy and Digital Imaging, National High Magnetic Field Laboratory*, The Florida State University, Tallahassee, FL, 2006.

Kniss et al., "Volume Rendering Multivariate Data to Visualize Meteorological Simulations: A Case Study," *IEEE TCVG Symposium on Visualization (2002)*, pp. 189-194.

Feb. 10, 2011 European Search Report issued in European Patent Application No. 07736167.3.

* cited by examiner

SYSTEM AND METHOD FOR VOLUME VISUALIZATION IN ULTRA-WIDEBAND RADAR

CROSS REFERENCE TO RELATED APPLICATIONS

This application claims the benefit of Israeli Patent Application No. 174737 titled "System and Method for Image Display in Ultra-Wideband Radar" and filed on Apr. 3, 2006, which is hereby incorporated by reference herein.

FIELD OF THE INVENTION

This invention relates to radar imaging systems and, more particular, to volume visualization in ultra-wideband radar imaging systems.

BACKGROUND OF THE INVENTION

Ultra-wideband (UWB) is a term for a classification of signals that occupy a substantial bandwidth relative to their centre frequencies (for example, according to the Federal Communications Commission (FCC) Rules, UWB signal is a signal whose fractional bandwidth (the ratio between its bandwidth to its center frequency) is equal to or greater than 0.2, or its bandwidth is equal to or greater than 500 MHz.). Their very high bandwidth allows UWB based radar systems to obtain more information about targets, and makes it possible to build radar with better spatial resolution compared to conventional radar. Therefore UWB radar devices are widely implemented for radar-based imaging systems, including ground penetrating radars, wall and through-wall radars, surveillance and medical imaging devices, etc. These applications require effective volume visualization based on obtained signal.

The terms "volume visualization" and "image reconstruction" used in this patent specification include any kind of image-processing, volume rendering or other image-reconstructing computing used to facilitate displaying three-dimensional (3D) data on a two-dimensional (2D) image surface.

The problem of presenting 3D data on radar image display has been recognized in prior art and various systems have been developed to provide a solution, for example:

U.S. Pat. No. 5,061,935 (Chogo et al.) discloses a three-dimensional display radar, which comprises a radar transmitter-receiver unit for producing signals indicative of information about a bearing of a target, information about distance to the target and information about the received power reflected from the target, respectively, a display, a three-dimensional coordinate converter for converting the bearing information, the distance information and the received power information into signals indicative of both an X-Y coordinate and the height of the target, marker generator for generating range marker signals when the target is three-dimensionally represented on a screen of the display, and a video memory having storage addresses corresponding to respective pixels on the display and for storing the received power information at a storage address corresponding to the X-Y coordinate obtained from the three-dimensional coordinate converter and storing therein the marker signals generated from the marker generator, the video memory being further adapted to successively read the received power information and the marker signals so as to deliver image signals to the display.

U.S. Pat. No. 5,280,344 (Witlin et al.) discloses the use of color to exhibit processing results from radar, sonar, spectral estimation, seismic profiling, radio astronomy, bio-engineering, and infrared imaging. The use of color for such raster display presentations has been limited to the coding of amplitude values for a fixed set of hue/luminance colors to convey recognition by a human operator. Hue and luminance are used here independently to convey two orthogonal pieces of low signal-to-noise sensor information simultaneously to an operator for quick and accurate recognition. The net result is an added degree of freedom available on a single display surface, which not only improves operator recognition and reaction time for critical events, but precludes the necessity of a second display presentation for the alternate information and subsequent correlation of two data sets by visual comparison. This invention discloses a system to generate and add a new color dimension, a fourth orthogonal axis to the presented data, in addition to position and luminance levels of a video display. The process adds information independent of the usual gray scale as saturated colors on a monotonic wavelength scale from red to green to blue.

U.S. Pat. No. 5,339,085 (Katoh et al.) disclose a radar display converting a radar signal to radar image information expressed in a three-dimensional orthogonal coordinate system with horizontal, vertical, and depth coordinates related to a certain viewpoint. Terrain and target information is converted to the same coordinate system and combined with the radar image information, producing a realistic three-dimensional display. Clipping is performed in a depth direction to eliminate portions of the radar image disposed behind terrain or target images. Terrain and target images disposed behind the radar image are reduced in intensity, but not clipped. Perspective projection and zoom transformations may also be carried out.

U.S. Pat. No. 5,793,375 (Tanaka) discloses an image processing apparatus for forming a high-quality surface display image at high speed. From raw data input by a medical image diagnosis apparatus, gray-level volume data and binary volume data in which a region-of-interest is extracted by binarizing are obtained. The binary volume data is subjected to ray-casting and projected onto a screen. A depth image formed of pixels on the screen and a distance between the screen and the surface (surface voxel) of a display object is obtained. The coordinates of the surface voxels are calculated from the depth image. Surface normals are obtained from voxel values of the gray-level volume data and a voxel values in the vicinity, and a shaded image is formed on the basis of surface normals.

U.S. Pat. No. 6,198,428 (Chogo) discloses three-dimensionally designed display radar in which a two-dimensional image data and three-dimensionally designed image data are depicted in combination in a video memory by the aid of an image controller, and they are simultaneously depicted on a screen of a display unit.

U.S. Pat. No. 6,212,132 (Yamane et al.) discloses a three-dimensional radar apparatus comprising a radar transmitting/receiving unit, a three-dimensional polygon-generating unit, and a three-dimensional graphics unit, wherein a radar transmitter/receiver outputs signals concerning orientation information, distance information, and reception intensity information on the basis of a radio wave reflected from a target, and a scan converter is used to convert the signals concerning the orientation information, the distance information, and the reception intensity information into two-dimensional radar image data composed of two-dimensional rectangular coordinates and brightness information of each of picture elements. The two-dimensional radar image data is also inputted into the three-dimensional polygon-generating unit to perform polygon-generating processing on the basis of the two-dimensional rectangular coordinates and the brightness information of each of the picture elements. Three-dimensional radar image data is prepared in the three-dimensional graphics unit on the basis of obtained polygon-based information, and it is accumulated in a frame memory. Thus, a three-dimensional radar image is displayed on a display device.

U.S. Pat. No. 6,571,177 discloses a single display providing visualization and interpretation of subtle structural and stratigraphic features of the 3-D data volume. Three substantially parallel surfaces are selected in a 3-D data volume and values of a seismic attribute on each of the three surfaces are encoded onto a Red-Green-Blue (RGB) color scale. The displayed seismic attribute may be the amplitude or one of many commonly used attributes. The 3-D data volume may be defined in terms of seismic times or in terms of seismic depths.

SUMMARY OF THE INVENTION

Typically, data acquired in UWB radars are fragmented, noisy, cluttered, may have unclear orientation in respect to the physical world, etc. The inventors found that the nature of data obtainable in UWB radar requires to provide a new UWB radar imaging system and method facilitating enhanced interpretation of the acquired data. The invention, in some of its aspects, is aimed to provide a novel solution facilitating perceivability of an image reconstructed per data acquired in ultra-wideband radar.

In accordance with certain aspects of the present invention, there is provided a volume visualization system configured to generate one or more perceiving image ingredients to be displayed together with an image reconstructed in accordance with data acquired in ultra-wideband radar. The perceiving image ingredient may be, for example, a shadow added to the reconstructed image, a position-dependent color scheme applied to the reconstructed image, a color scheme adapted to external lighting conditions and applied to the reconstructed image, a Halo artificially added to the reconstructed image, a distinctive color scheme applied to time-invariant and time-variant elements of the reconstructed image, etc.

In accordance with other aspects of the present invention, there is provided a method for volume visualization, the method comprising image-reconstructing processing of data acquired in ultra-wideband radar and facilitating displaying the reconstructed image, wherein the method further comprises perceiving processing provided in order to facilitate a meaningful representation and/or an instant understanding of the image to be displayed. The perceiving processing is resulted in generating one or more perceiving image ingredients.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

The terms "perceive an image", "perceiving processing" or the like used in this patent specification include any kind of image-processing, rendering techniques or other computing used to provide the image with a meaningful representation and/or an instant understanding, while said computing is not necessary for the image reconstruction. Perceiving processing may include 2D or 3D filters, projection, ray casting, perspective, object-order rendering, compositing, photo-realistic rendering, colorization, 3D imaging, animation, etc., and may be provided for 3D and/or 2D data.

The term "perceiving image ingredient" used in this patent specification includes any kind of image ingredient resulting from a perceiving processing as, for example, specially generated visual attributes (e.g. color, transparency, etc.) of an image and/or parts thereof, artificially embedded objects or otherwise specially created image elements, etc.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of image visualization that are applicable to the present invention. Therefore the full contents of these publications are incorporated by reference herein where appropriate, for appropriate teachings of additional or alternative details, features and/or technical background.

Figure 1:
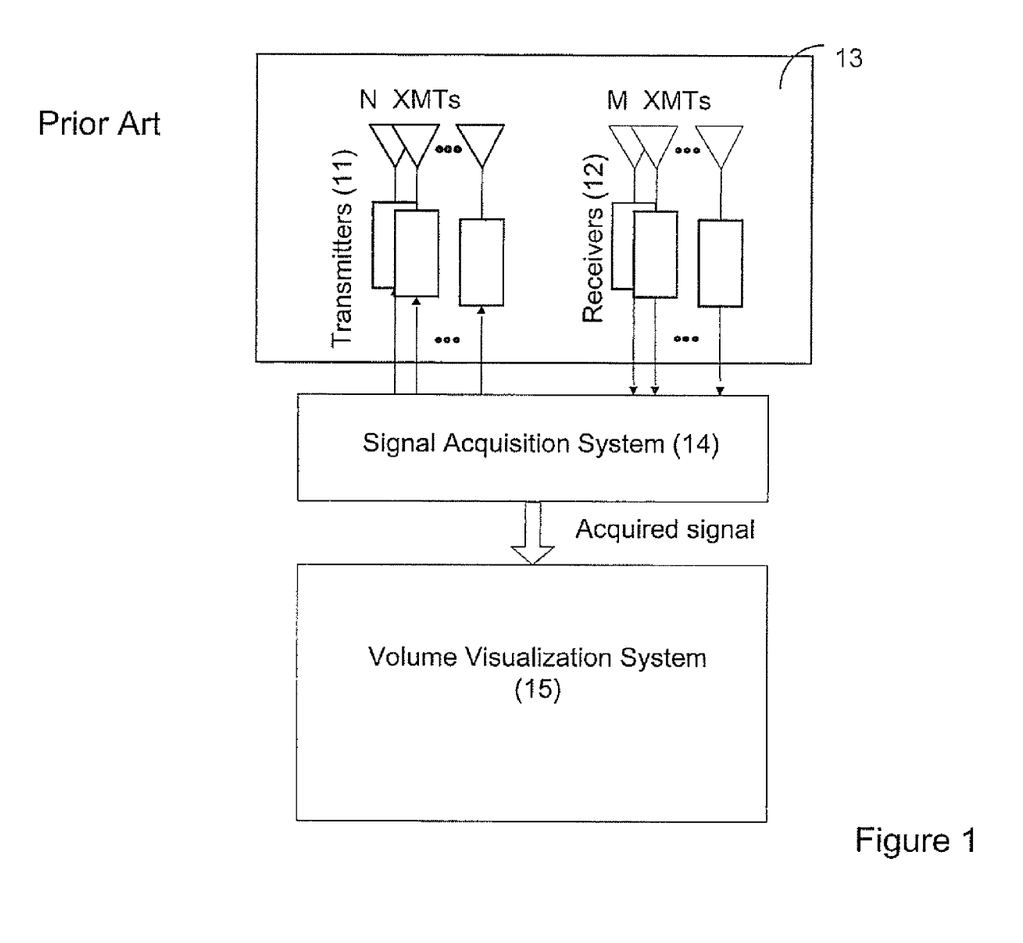
FIG. 1 is generalized block diagram of radar imaging system as known in the art.

Bearing this in mind, attention is drawn to FIG. 1 illustrating a generalized block diagram of a UWB radar imaging system as known in the art.

The UWB radar imaging system comprises $N \geq 1$ transmitters 11 and $M \geq 1$ receivers 12 arranged in (or coupled to) an antenna array 13. At least one transmitter transmits a pulse signal (or other form of UWB signal, such as M-sequence coded signal) to a space to be imaged and at least one receiver captures the scattered/reflected waves. To enable high quality imaging, sampling is provided from several receive channels. The process is repeated for each transmitter separately or simultaneously with different coding per each transmitter (e.g. M-sequence UWB coding). The received signals are transferred to a signal acquisition system 14 coupled to the antenna 13. The signal acquisition system is capable of receiving the signals from a plurality of receivers, of providing the integration of the received signals and of controlling the signal acquisition process.

The resulting integrated signals (typically from all receivers for each transmitter) are transferred to a volume visualization system 15 operationally coupled to the signal acquisition system. The volume visualization system is configured to provide image reconstruction by using different appropriate techniques), and to facilitate displaying the resulting two dimensional image on the screen.

Note that the invention is not bound by the specific UWB radar structure described with reference to FIG. 1 or image reconstruction technique. Those versed in the art will readily appreciate that the invention is, likewise, applicable to any other UWB radar. Also it should be noted that the functionality of the plurality of physical transmitters and receivers may be also provided by synthetic aperture radar techniques.

Figure 2:
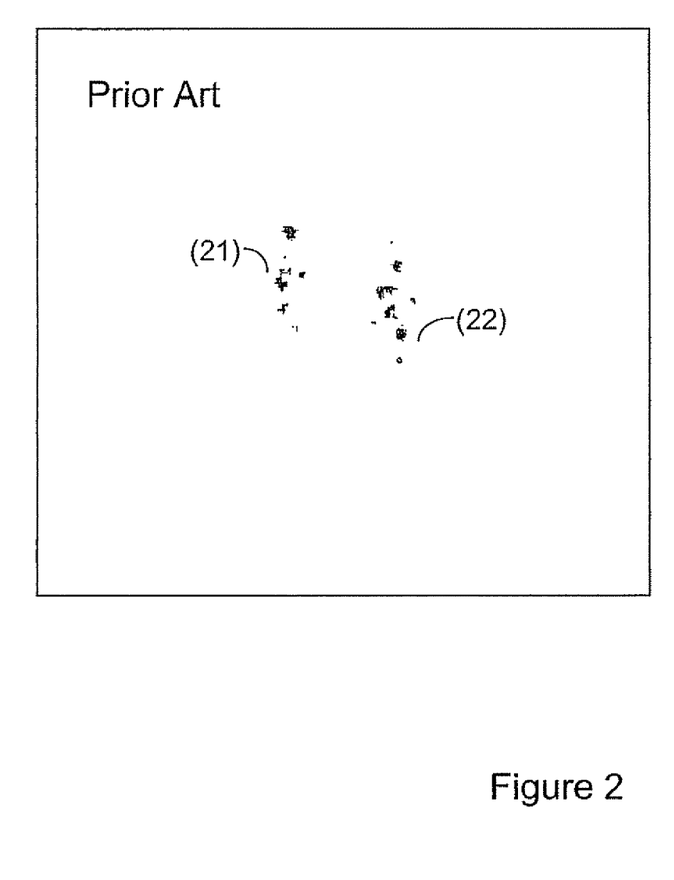
FIG. 2 illustrates a fragment of a sample screen comprising an exemplary image reconstructed as known in the art.

FIG. 2 illustrates a fragment of a sample screen comprising an image reconstructed and displayed in accordance with technologies known in the prior art. The illustrated displayed objects (21) and (22) are fragmented, as the acquired data in UWB radar are, typically, fragmented.

In accordance with certain embodiments of the present invention, the radar imaging system is configured to process the acquired signal and/or derivatives thereof in order to perceive the image to be displayed. Said perceiving processing may be provided as a part and/or in parallel and/or after image processing on three-dimensional and/or two-dimensional data. Said perceiving processing may result in different perceiving image ingredients as detailed, by way of non-limiting examples, with reference to FIGS. 3-9.

Figure 3:
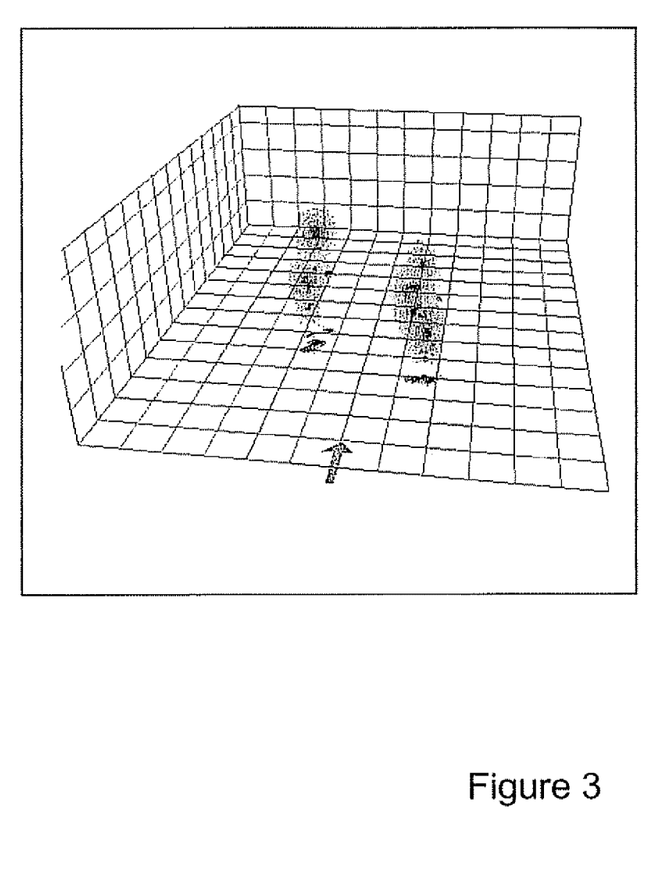
FIG. 3 illustrates a fragment of a sample screen comprising an exemplary image perceived in accordance with certain aspects of the present invention.

FIG. 3 illustrates, by way of non-limiting example, a fragment of a sample screen wherein the image illustrated in FIG. 2 is perceived in accordance with certain embodiments of the present invention as will be further detailed with reference to FIGS. 4-9.

Figure 4A:
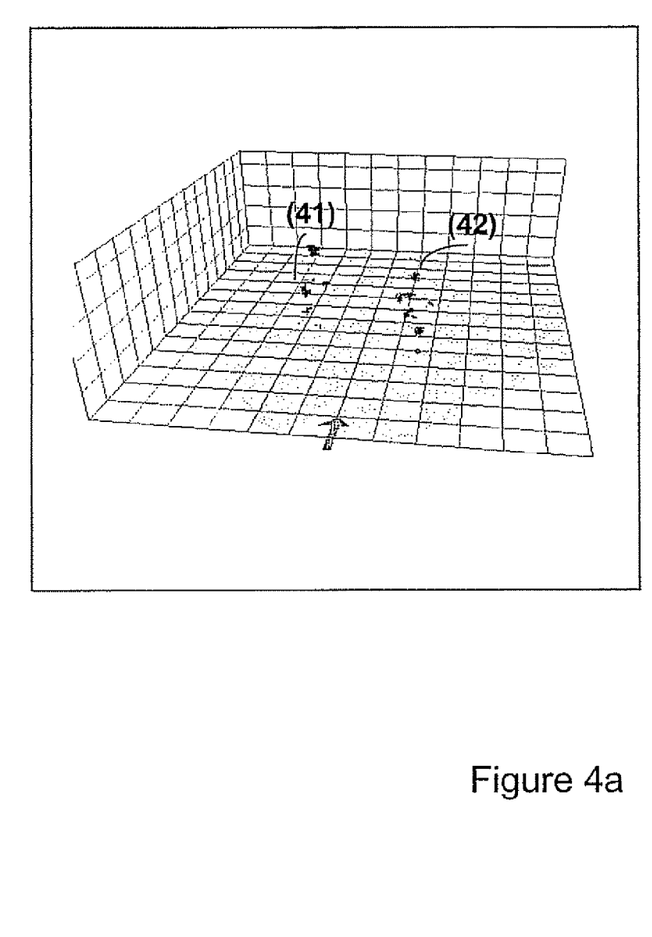
FIGS. 4a-4b illustrate fragments of sample screens before and after implementation of shadow generation in accordance with certain embodiments of the present invention.
Figure 4B:
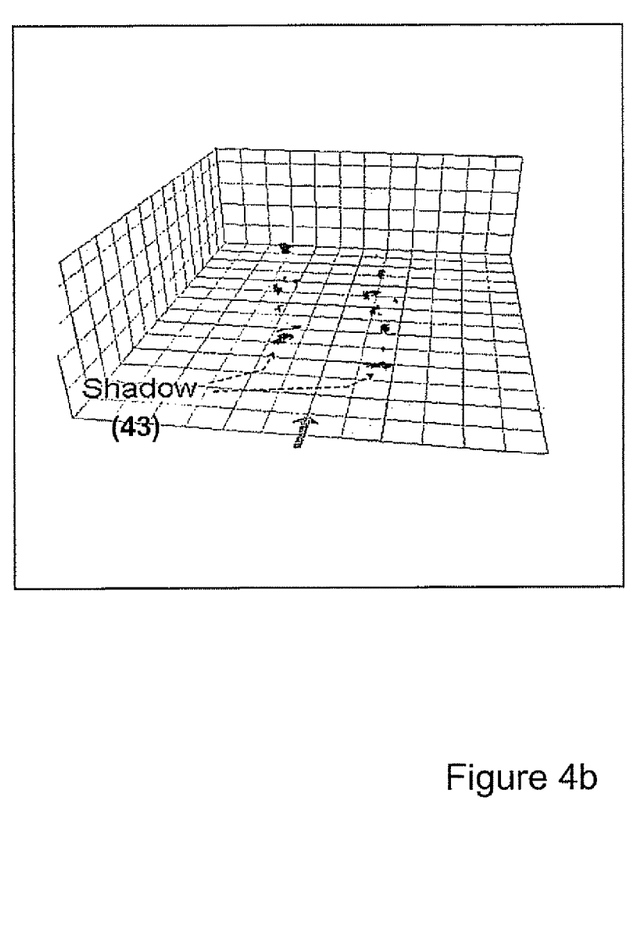

In accordance with certain embodiments of the present invention the perceiving processing comprises shadow generation as illustrated, by way of non-limiting example in fragments of a sample screen in FIGS. 4a-4b. FIG. 4a illustrates reconstructed image elements (41) and (42) before implementation of shadow generation, and FIG. 4b illustrates a shadow (43) as a perceiving image ingredient allowing a viewer to gauge the location of certain objects. Shadow generation comprises calculating the attenuation by one or more objects in the volume by light emitted by light sources, said light sources may be placed in arbitrary locations. Said attenuation results in areas that are darker in the image, and give an appearance similar to shadows.

Due to the nature of UWB radar and/or the reconstruction process, conventionally reconstructed objects may be disconnected from surfaces upon which they are located (e.g. this is a typical problem in through-wall imaging). Among advantages of shadow generation, in accordance with certain embodiments of the present invention, is facilitating certainty between locations ranging from "near and high" to "far and low". As illustrated by way of non-limiting example in FIG. 4b, for objects in a room (which are typically located on the floor), shading the volume data by projection on the floor, allows the user to ascertain the location of objects in the volume. In the illustrated example the light source is selected above the rendering volume, while the resulting shadow is generated on the plane below said volume.

The shadow generation may be implemented by performing a grey-scale volume-rendering process from an arbitrary viewpoint, corresponding with the location of the light-source, with the output screen being set in the same location as the target plane (e.g. for shadow on a floor—viewpoint is above the volume, and the screen is set to be the floor). The resulting image pixels of this rendering process are then projected to the volume, as tiles corresponding to the relative location of the pixel on the floor, with a black color and a transparency proportionate to the grey-scale value of the pixel. Said projection of shadow pixels is performed prior to the compositing of the floor plane, which results in the floor plane being attenuated by the transparency of the shadow pixel.

In other embodiments of the invention the shadow generation may comprise calculating the resulting shadow in every location of the volume (in contrast to an arbitrary plane). Such generation may be provided, by way of non-limiting example, by performing a ray-casting operation from each light source. Instead of storing just the terminal value of the ray-casting process, this process would store the light (and direction of light) reaching substantially each and every point in the three dimensional volume (e.g. by holding a three-dimensional data-structure of the volume). During the ray-casting process, each time the ray reaches a new voxel in this three-dimensional data structure, the current value of light is accumulated to the value in the three-dimensional data structure.

For different image elements the shadows may be generated with different colors, thus facilitating further meaning in representation of the reconstructed images. This may be provided by extension of the grey-scale only technique to a multivariate generation that considers several color components in tandem.

Figure 5:
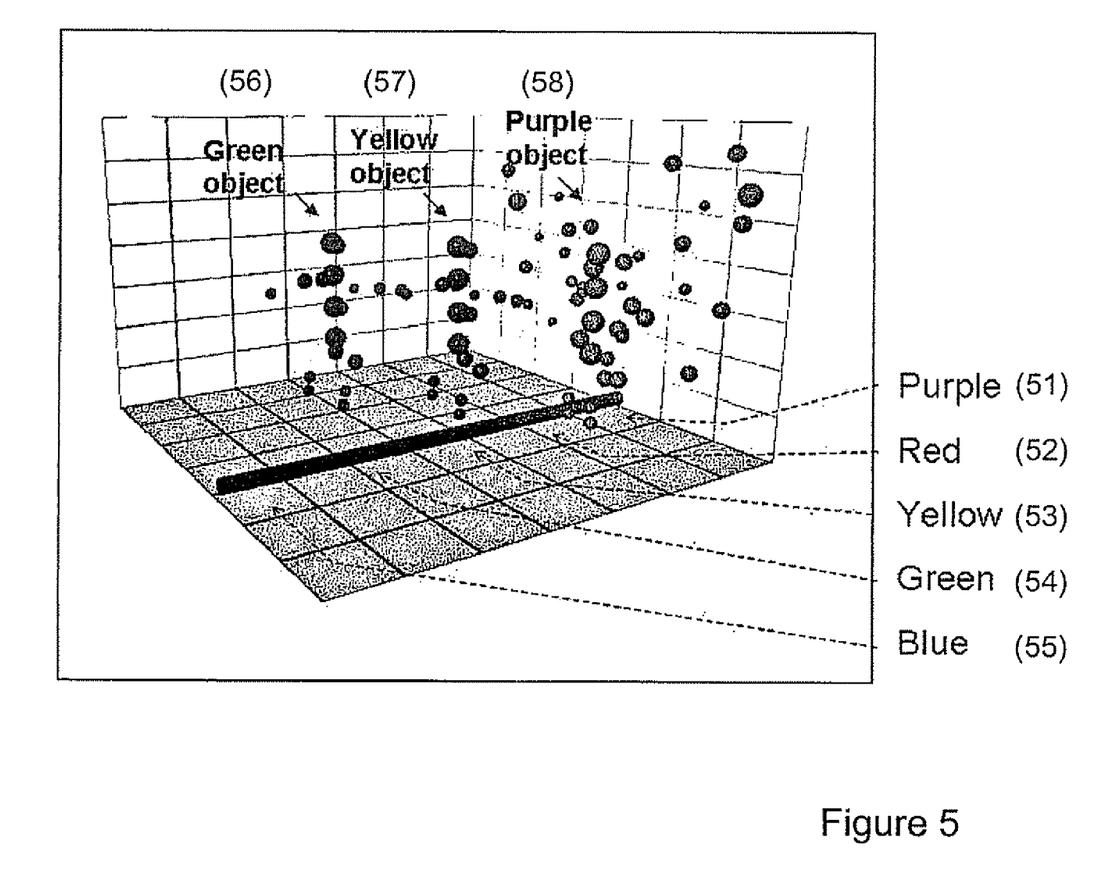
FIG. 5 illustrates a fragment of a sample screen after implementation of position-dependent coloring in accordance with certain embodiments of the present invention.

In accordance with certain embodiments of the present invention the perceiving processing comprises a position-dependent coloring as illustrated, by way of non-limiting example, in FIG. 5. The position-dependent coloring comprises generating a position-dependent color grade (ranks (51)-(55)), and coloring different objects in the volume data according to their respective positions. For example, objects (56)-(58) will be colored as green, yellow and purple in accordance with colors of respective ranks, thus position-dependent colors serve as perceiving image ingredients. Coloring may be provided according to any dimension in a Polar, Cartesian or other coordinate system. For example coloring can be graded according to range, elevation or azimuth in a Polar coordinate system.

Projecting 3D data onto a 2D screen may result in projecting several distinct ranges in the same 2D area. In addition, since the volume data acquired in UWB radar are fragmented, it is difficult to associate several distinct reflectors as a single object, e.g. such as a person. As different fragments of an object are generally close to each other, and different distinct objects are at different distances (e.g. which typically occurs in through-the-wall imaging), coloring the volume data per position-dependent color grade may provide substantially all fragments of a single object with the same color and, thus, enables discerning them from other farther reflectors.

A possible implementation of the color-grading technique, for a display system that utilizes volume-rendering, is to set the transfer function of the volume rendering process to a two dimensional transfer function that is dependent both on the distance of the voxel and the amplitude of the voxel. Said two-dimensional function could then map the distance of the voxel to hue, and the amplitude to transparency. As all voxels in a given distance are provided with the same color, and voxels that are near to said voxels are provided with small variations of said colors, an object consisting of the voxels in a given small sub-range will appear colored in a single distinct color. Objects that are in different ranges, will be assigned a sub-band of colors that are perceptually distinct from one another.

Figure 6:
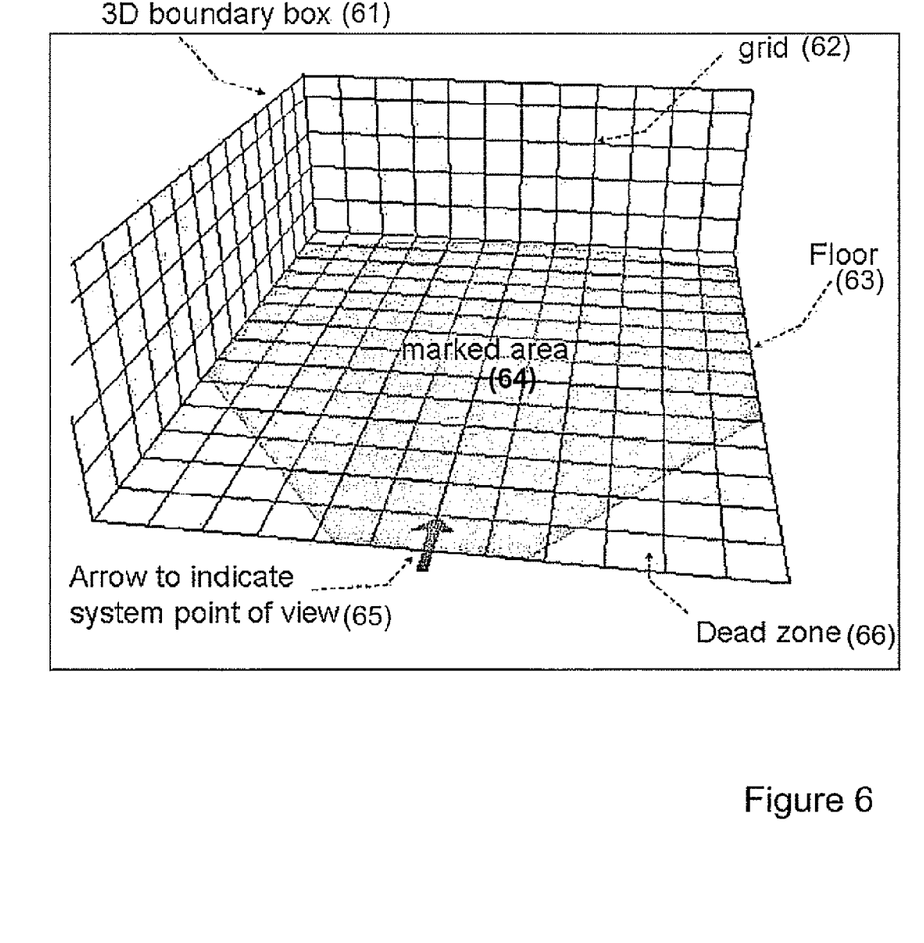
FIG. 6 illustrates a fragment of a sample screen after implementation of virtual objects generation in accordance with certain embodiments of the present invention.

In accordance with certain embodiments of the present invention the perceiving processing comprises a generation of virtual objects as illustrated, by way of non-limiting example, in FIG. 6. Generation of virtual objects comprises adding simulated perceiving image ingredients to the rendered volume, typically, to the 3D volume projected on the 2D screen. Such virtual objects can include artificial objects (e.g. floor (63), markers, 3D boundary box (61), arrows (65), grid (62), icons, text (66), marked area (64), etc.), pre-recorded video images (e.g. terrain images, medical images, etc.) and other.

In UWB radars some important volume data may be missing due to lack of reflections from certain objects (e.g. a floor of the imaged room in through-wall imaging, etc.) However, for a human viewer, these certain objects may be important for understanding (e.g. of the orientation of reflected objects in the room, etc.). As a result of artificially adding a virtual object to the reconstructed image (e.g. adding floor at the approximate height and slope of the room's floor, etc.) the orientation of objects in the volume becomes clearer. For example, typically added objects for through-wall imaging are a floor (for object orientation and shadow display), dead-zone markings (in order to convey system limits), an arrow (in order to mark the system's location and direction in the volume), and a grid (for measurement of objects' location).

The generating of virtual objects may be provided, for example, by converting to the 3D artificial objects to a set of voxels, and adding these voxels to the volumetric data-set that is rendered by the volume-rendering process. Said conversion would assign a color and transparency to each generated voxel. One possible, simple, assignment would be to set said voxels to a uniform transparency and color that correspond to the color and transparency desired for the artificial object. Conversion of the artificial object to voxels varies by the shape of the object. Conversion of a plane to a set of voxels may involve traversing the entire span of the plane and creating a voxel in each location of the plane. A similar procedure may be used for lines. As most objects can be described as a set of planes and lines, more complex objects could be described as such a set, with subsequent conversion of each plane and line to a set of voxels.

Figure 7A:
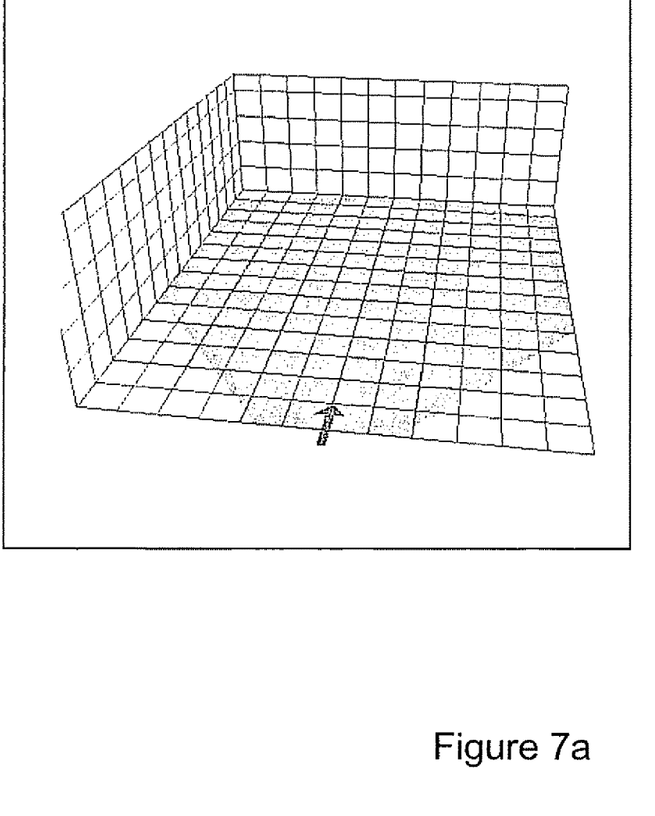
FIGS. 7a and 7b illustrate fragments of sample screens after implementation of day and night mode color schemes in accordance with certain embodiments of the present invention.
Figure 7B:
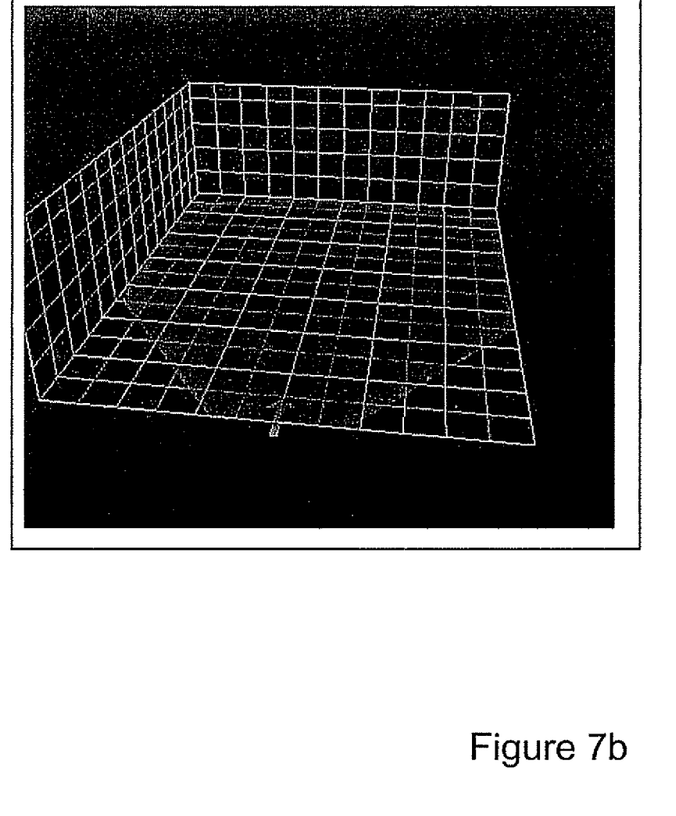

FIGS. 7a and 7b illustrate, by way of non-limiting example, fragments of a sample screen after implementation of day and night mode color schemes. In accordance with certain embodiments of the present invention, perceiving image ingredients may comprise different color schemes adapted to external lighting conditions. For example, the system may be adapted to day (FIG. 7a), night (FIG. 7b), or indoor illumination. Such adaptation may be performed automatically by the system (according to a clock or light sensor), or may be selected manually by the operator. The predefined and/or configurable color schemes may be applied to virtual objects generated in accordance with certain embodiments of the present invention and/or may be provided by utilizing different transfer-functions in the volume-rendering processing.

Optimal colors vary according to lighting conditions (for instance, in dark night-time conditions, a strong white background may interfere with the operator's night vision). By using different schemes according to external or user constraints, the system is usable in a wide range of scenarios while still displaying information with a high dynamic range.

Figure 8A:
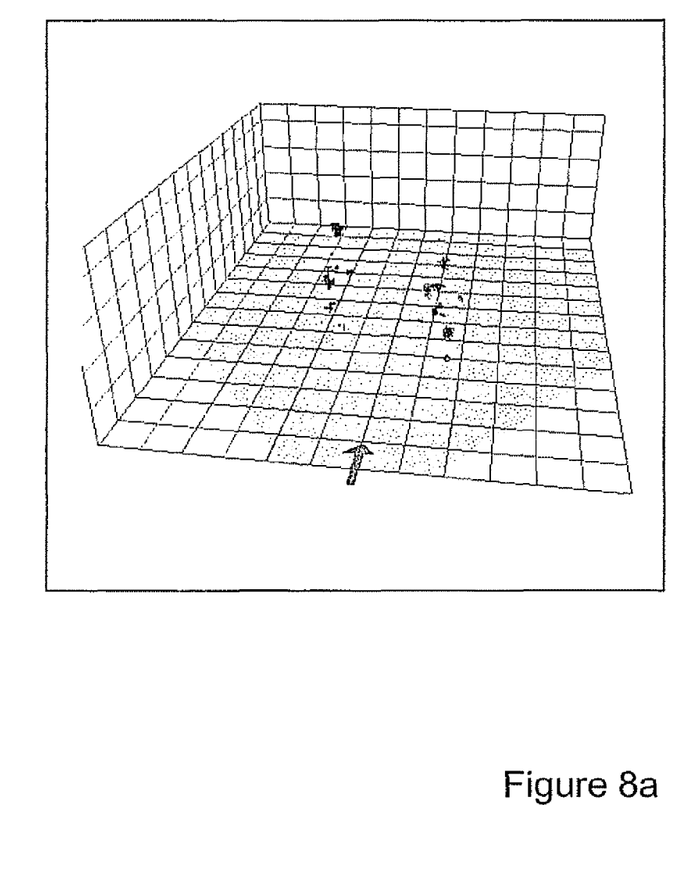
FIGS. 8a and 8b illustrate fragments of sample screens before and after implementation of halo generation in accordance with certain embodiments of the present invention.
Figure 8B:
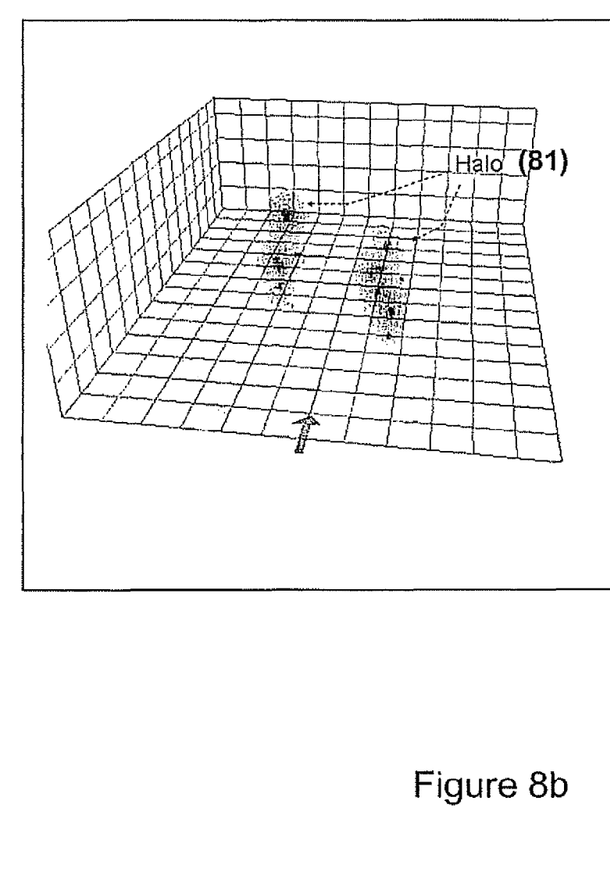

In accordance with certain embodiments of the present invention the perceiving processing comprises separate processing of different data sets selected in accordance with certain criteria. The processed data sets are aggregated onto the same screen with different visual attributes (colors, texture, etc.) as illustrated, by way of non-limiting example, in FIGS. 8 and 9. The aggregation may be provided in 3D or 2D space. This technique may be implemented by volume rendering on multiple input data sets that utilizes a different transfer function for each data set, by a 2D compositing operation between two 2D images, etc.

FIGS. 8a-8b illustrate fragments of a sample screen before and after implementation of a Halo generation in accordance with certain embodiments of the present invention. The Halo generation comprises volume rendering provided for a combination of original data sets with one or more filtered data sets. This may be done by convolving the input data with a 3D point spread function that acts as a low-pass. The filter shape may be a Gaussian or some other shape that produces a low-pass filter. The filtered data is then summed with the original data and displayed via volume-rendering. This summation may be also be performed prior to volume-rendering, or by performing two separate volume-rendering processes and compositing the 2D results. In accordance with certain embodiments of the present invention, the Halo technique facilitates artificial connection of different fragments in a single object without losing the original volume data resolution. In certain embodiments of the invention the halo technique may include drawing a semi-transparent circle of light surrounding the original reconstructed image. For example, as illustrated in FIG. 8a, an image of a person is fragmented and may be originally reconstructed as several disconnected fragments corresponding to different body parts (e.g. head, torso, legs) with large gaps between them. By adding halo, as illustrated in FIG. 8b, these gaps are filled and a continuous silhouette of the person can be discerned.

Figure 9:
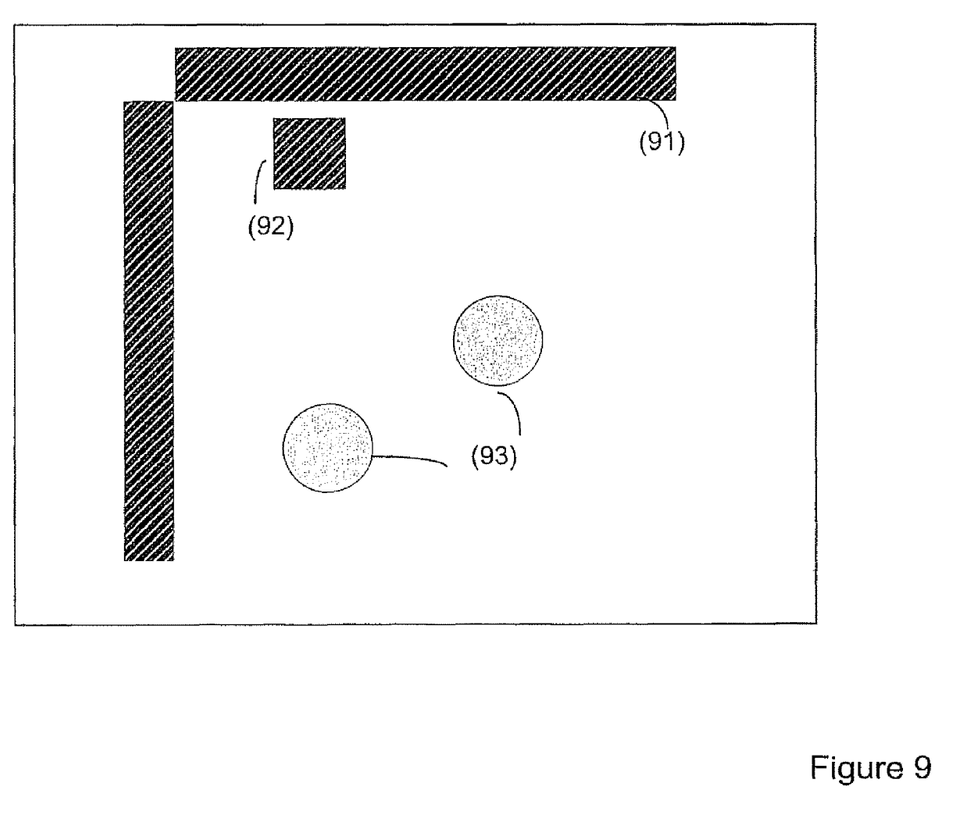
FIG. 9 schematically illustrates a screen presenting time-variant and time-invariant data sets in accordance with certain embodiments of the present invention.

FIG. 9 schematically illustrates a sample screen simultaneously presenting time-invariant and time-variant data sets. In accordance with certain embodiments of the present invention, time-invariant elements of the image (e.g. representing static objects like walls (91), furniture (92), etc.) are colored in a predefined color(s), while time-variant elements of the image (e.g. representing moving objects (93), their electromagnetic shadows on walls, etc.) are colored in another predefined color(s) or, for example, in accordance with position-dependent color grade. The time-variant and time-invariant data sets are separately processed in 3D or 2D space in a manner similar to halo generation described above.

Among advantages of such perceiving processing is allowing the user to see the locations of static reflectors, differentiate between static and dynamic objects, between dynamic objects of different nature, etc. For example, as electro-magnetic shadows (resulting from the occlusion of the antenna's electro-magnetic radiation by moving objects) usually appear over the static objects (having pre-defined color), the above perceiving processing facilitates differentiating dynamic objects and dynamic shadows.

Those skilled in the art will readily appreciate that the perceiving processing detailed with reference to FIGS. 4-9 may be implemented in different ways, some of them known in the art. For example, *Volume rendering (Proceedings of the 15th annual conderence on Computer graphics and interactive techniques (SIGGRAPH '88))* by Robert A. Drebin, Loren Carpenter, Pat Hanrahan, introduces a volume-rendering technique that may be used for the display of volumetric data. *Recent Advances in Volume Visualization*, Ken Brodlie, and Jason Wood, *Computer Graphics Forum, Vol.* 20, *Issue* 2 (June 2001), provides a recent overview of the techniques known in the volume visualization field. *A survey of shadow algorithms* Woo, A, Poulin, P, Fournier, *A IEEE Computer Graphics and Applications. Vol.* 10, *no.* 6, *pp.* 13-32. 1990, provides an overview of various shadow generating techniques.

It should be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A volume visualization system comprising a display operatively coupled to an image-reconstructing module configured to process 3D data acquired by ultra-wideband radar and to generate a 2D reconstructed image,
    wherein the image reconstruction module is further configured to provide separate volume rendering of time-invariant and time-variant 3D data sets acquired by said ultra-wideband radar thereby extracting time-invariant and time-variant elements of the reconstructed image; and to generate one or more perceiving image ingredients to be distinctively applied to said extracted time-invariant and/or time-variant elements of the reconstructed image; and
    wherein the display is configured to simultaneously present the time-invariant and time-variant elements of the reconstructed image together with applied perceiving image ingredients.

2. The volume visualization system of claim 1 wherein the perceiving image ingredient is a shadow added merely to time-invariant elements of the reconstructed image.

3. The volume visualization system of claim 1 wherein the perceiving image ingredients are a first position-dependent color scheme applied to the time-invariant elements and a second position-dependent color scheme applied to time-variant elements of the reconstructed image.

4. The volume visualization system of claim 1 wherein the perceiving image ingredient is a virtual object artificially added merely to time-invariant elements of the reconstructed image.

5. The volume visualization system of claim 1 wherein the perceiving image ingredient is a Halo artificially added merely to time-variant elements of the reconstructed image.

6. The volume visualization system of claim 1 wherein the perceiving image ingredient is a distinctive color scheme applied to time-invariant and time-variant elements of the reconstructed image.

7. A method of operating a volume visualization system associated with an ultra-wideband radar, the method comprising;
    image-reconstructing processing comprising separate volume rendering of time-invariant and time-variant 3D data sets acquired by said ultra-wideband radar thereby extracting time-invariant and time-variant elements of a reconstructed image merely from data acquired by said ultra-wideband radar;
    generating one or more perceiving image ingredients;
    distinctively applying the generated one or more perceiving image ingredients respectively to time-invariant and/or time-variant elements of the reconstructed image; and
    facilitating simultaneously displaying the time-invariant and time-variant elements of the reconstructed image together with applied perceiving image ingredients.

8. The method of claim 7 wherein the generated perceiving image ingredients comprise a shadow added merely to the time-invariant elements.

9. The method of claim 7 wherein the perceiving image ingredients comprise a first position-dependent color scheme applied to time-invariant elements and a second position-dependent color scheme applied to time-variant elements.

10. The method of claim 7 wherein the generated perceiving image ingredients comprise a virtual object artificially added merely to time-invariant elements.

11. The method of claim 7 wherein the generated perceiving image ingredients comprise a Halo added merely to time-variant elements.

12. The method of claim 7 wherein the generated perceiving image ingredients comprise a distinctive color scheme for time-invariant and time-variant elements.

13. A non-transitory computer readable medium storing a computer readable program executable by a computer for causing the computer to perform a process of volume visualization, the process comprising:
(a) image-reconstructing processing comprising simultaneously extracting time-invariant and time-variant elements of a reconstructed image merely from data acquired by said ultra-wideband radar;
(b) generating one or more perceiving image ingredients;
(c) distinctively applying the generated one or more perceiving image ingredients respectively to time-invariant and/or time-variant elements of the reconstructed image; and
(d) facilitating displaying the reconstructed image with the applied perceiving image ingredients.

14. A computer program product comprising a non-transitory computer readable medium storing computer readable program code for a computer, the computer program product comprising:
(a) computer readable program code for causing the computer to provide image-reconstructing processing comprising simultaneously extracting time-invariant and time-variant elements of a reconstructed image merely from data acquired by said ultra-wideband radar;
(b) computer readable program code for causing the computer to generate one or more perceiving image ingredients;
(c) computer readable program code for causing the computer to distinctively apply the generated one or more perceiving image ingredients respectively to time-invariant and/or time-variant elements of the reconstructed image; and
(d) computer readable program code for causing the computer to facilitate displaying the reconstructed image with the applied perceiving image ingredients.

* * * * *